3,070,877
TRACTOR WHEEL MOVER
Robert H. Schumann, Rte. 1, Ida Grove, Iowa
Filed Nov. 24, 1959, Ser. No. 855,229
6 Claims. (Cl. 29—267)

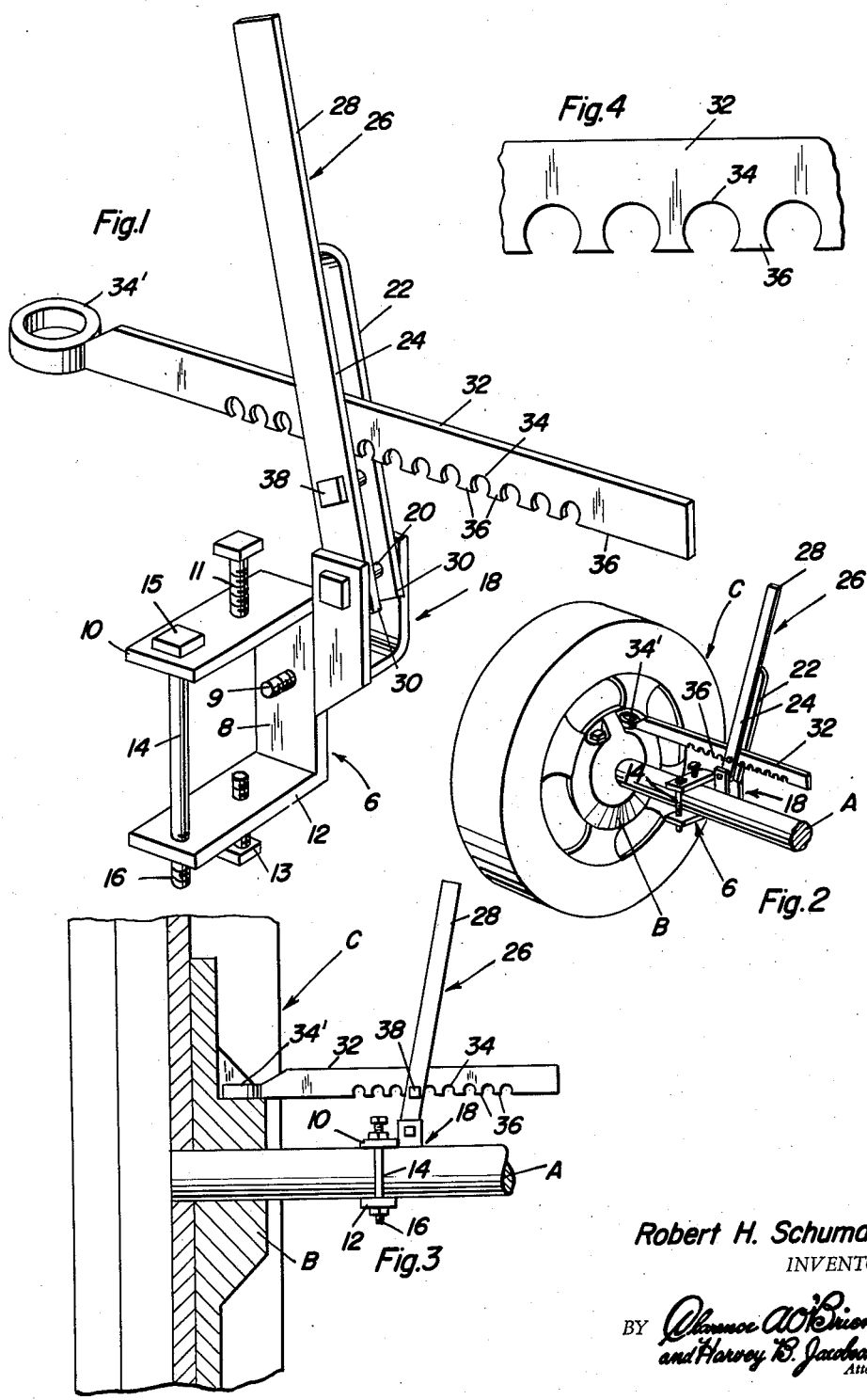

The present invention relates to certain new and useful improvements in devices which have come to be known as tractor wheel moving and adjusting devices and the purpose of which is to shift the wheels on the supporting axle either in or out to regulate the distance between the wheels.

As the preceding general statement of the nature of the invention reveals, many and varied styles and forms of mechanical pushing and pulling devices have been devised for use in this general line of endeavor. Moreover, it is a fact now generally well recognized that devices specifically made for tractor wheel adjusting purposes often take the form of a so-called axle attachment. Inasmuch as readily applicable and removable attachments appear to be in keeping with expected advances in this art, the present invention follows in this trend of thinking and takes the form of an attachment which, however, is structurally and functionally distinct from known prior art adaptations and is such that it will better serve the intended purposes for which it has been perfected for use.

Briefly summarized, the present invention is characterized by three primary components or parts; namely, a novel U-shaped adapter bracket or clamp which lends itself to reliable and successful mounting on the axle and which also provides an excellent perch or mount for a manually actuable lever. The lever is reliably and hingedly mounted on the bracket by way of a yoke forming a part of the bracket. The lever has a fork at its hingedly connected end, the arms of the fork straddling a simple push-pull bar. The bar has rack teeth connectable with an adjusting pin on the fork and is also provided at one end with a ring-like eye anchorable on an attaching lug provided therefor on the hub portion of the slidingly mounted tractor wheel.

The bracket is simple but unique in that it comprises a generally U-shaped member the limbs of which have their free ends bolted together and said limbs and bight portion being provided with setscrews. The bight portion also carries the aforementioned yoke.

The concept also features the idea of the rack or push-pull bar extending between the arms of the yoke and with the rack teeth connectable with a pin provided therefor on the fork arms. More particularly, one end of the bar has a simple eye which can be removably and pivotally connected to an anchoring stud on the hub of the wheel.

Other objects, features and advantages will become more readily apparent from the following description and the accompanying illustrative drawing.

In the drawing:
FIG. 1 is a view in perspective showing the complete ready-to-use wheel moving and adjusting attachment and detailing the construction and arrangement of the several main parts;

FIG. 2 is a smaller view in perspective showing how the attachment is applied and used in adjusting the slidingly mounted wheel on the axle either in or out;

FIG. 3 is a view on a larger scale which may be said to be based on the assembly view seen in FIG. 2; and FIG. 4 is an enlarged view of the rack teeth on the push-pull bar.

The bracket or clamp which, as stated, is generally U-shaped, is denoted generally by the numeral 6 and it embodies a bight portion 8 with a setscrew 9, an upper limb 10 with a setscrew 11, a lower spaced parallel limb 12 with a setscrew 13, the apertured free end portions of the limbs serving to accommodate an insertable and removable binding and clamping bolt 14. The setscrews 11 and 13 are longitudinally aligned. The headed upper end 15 of the bolt extends through the aperture in the limb 10 and the aperture in the lower limb is threaded to accommodate the screw-threaded end portion 16 of the bolt. The legs or limbs may be slightly yielding so that when they straddle the axle A they may be readily and firmly clamped to thus temporarily secure the bracket horizontally on the axle for sliding and rotary adjustment. The bight portion 8 of the bracket 6 has fixed thereon an upstanding suitably positioned yoke generally denoted by the numeral 18. The yoke arms carry an insertable and removable hinging bolt 20 to accommodate the cooperating arms 22 and 24 of a fork provided at the lower end portion of the lever 26. The handle portion of the lever is denoted at 28. The fork arms are positioned between the yoke arms and are hingedly mounted on the hinging bolt 20. The extreme lower end portions 30 are pocketed in the space of the yoke and have contact with the yoke arms to provide a rigid and reliable hinge-joint or connection. The aforementioned push-pull bar is denoted at 32 and is of suitable length and rigidity. It is preferably of flat metal strap form so that the median and end portion may operate with requisite nicety in the space between the fork arms 22 and 24 as shown. At the left hand or attachable end the push-pull bar is provided with a rigid ring-like attaching and pivoting eye 34' which is engageable by gravity over the head of one of the usual lug bolts which secure the wheel to the axle. Generally circular or C-shaped notches 34 are provided in the lower edge 36 of the bar and they, in turn, define rugged rack teeth 36 with flat crown portions and satisfactory corner constructions to permit the same to be detachably and adjustably connected with the bolt 38 on the median portion of the fork arms 22 and 24.

In practice it is obvious that the adapter bracket 6 is applied to the axle in the manner shown in FIGS. 2 and 3. The components of the bracket straddle the axle and the setscrews are adjusted to bind against circumferentially spaced portions of the axle and the bolt 14 avoids displacements and also permits a tight clamping action to be effected. With the bracket in place the hinged lever is also in readiness for use. Obviously, the rack teeth engage the bolt or pin 38 so that as the lever 26 is rocked back and forth on its pivot the desired push-pull result is attained.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An adjusting tool for a tractor wheel slidable on an axle and including a hub comprising a securing bolt, said tool including a bracket comprising a generally U-shaped clamp for straddling the axle, means for removably and longitudinally slidably adjustably securing the clamp horizontally on the axle, a hand lever including a forked end portion, means pivotally securing the forked end portion of the lever to the clamp for swinging movement in a vertical plane adjacent one side of the axle, a bar operable in said forked end portion of said lever, an eye on one end of the bar engageable by gravity with the bolt for detachably anchoring said bar to the wheel, and means adjustably and detachably connecting the bar to the lever for actuation in opposite directions thereby for adjusting the wheel longitudinally in either direction on the axle, the second-named means including an upwardly-opening yoke affixed to the bight portion of the clamp and pivotally receiving the lever.

2. An adjusting tool for a tractor wheel slidable on an axle and including a hub comprising a securing bolt, said tool including a bracket comprising a generally U-shaped clamp for straddling the axle, means for removably and longitudinally slidably adjustably securing the clamp horizontally on the axle, a hand lever including a forked end portion, means pivotally securing the forked end portion of the lever to the clamp for swinging movement in a vertical plane adjacent one side of the axle, a bar operable in said forked end portion of said lever, an eye on one end of the bar engageable by gravity with the bolt for detachably anchoring said bar to the wheel, and means adjustably and detachably connecting the bar to the lever for actuation in opposite directions thereby for adjusting the wheel longitudinally in either direction on the axle, the first-named means comprising a bolt connecting the free end portions of the clamp legs for drawing said legs toward each other for frictionally gripping the axle therebetween, and aligned setscrews threadedly mounted on the clamp legs and engageable with the axle on diametrically opposite sides thereof for further securing said clamp in adjusted position thereon, the second-named means including an upwardly-opening yoke affixed to the bight portion of the clamp and pivotally receiving the lever.

3. An adjusting tool for a tractor wheel slidable on an axle and including a hub comprising a securing bolt, said tool including a bracket comprising a generally U-shaped clamp for straddling the axle, means for removably and longitudinally slidably adjustably securing the clamp horizontally on the axle, a hand lever including a forked end portion, means pivotally securing the forked end portion of the lever to the clamp for swinging movement in a vertical plane adjacent one side of the axle, a bar operable in said forked end portion of said lever, an eye on one end of the bar engageable by gravity with the bolt for detachably anchoring said bar to the wheel, and means adjustably and detachably connecting the bar to the lever for actuation in opposite directions thereby for adjusting the wheel longitudinally in either direction on the axle, the last-named means including a pin on the lever traversing the fork, said bar resting by gravity on said pin and having notches therein selectively receiving said pin, the second-named means including an upwardly-opening yoke affixed to the bight portion of the clamp and pivotally receiving the lever.

4. An adjusting tool in accordance with claim 3, wherein said notches are generally C-shaped for retaining the pin therein when the lever is swung in either direction.

5. An adjusting tool for a tractor wheel slidable on an axle and including a hub comprising a securing bolt, said tool including a bracket comprising a generally U-shaped clamp for straddling the axle, means for removably and longitudinally slidably adjustably securing the clamp horizontally on the axle, a hand lever including a forked end portion, means pivotally securing the forked end portion of the lever to the clamp for swinging movement in a vertical plane adjacent one side of the axle, a bar operable in said forked end portion of said lever, an eye on one end of the bar engageable by gravity with the bolt for detachably anchoring said bar to the wheel, and means adjustably and detachably connecting the bar to the lever for actuation in opposite directions thereby for adjusting the wheel longitudinally in either direction on the axle, the first-named means comprising a bolt connecting the free end portions of the clamp legs for drawing said legs toward each other for frictionally gripping the axle therebetween, and aligned setscrews threadedly mounted on the clamp legs and engageable with the axle on diametrically opposite sides thereof for further securing said clamp in adjusted position thereon, the last-named means including a pin on the lever traversing the fork, said bar resting by gravity on said pin and having notches therein selectively receiving said pin, the second-named means including an upwardly-opening yoke affixed to the bight portion of the clamp and pivotally receiving the lever.

6. An adjusting tool for a tractor wheel slidable on an axle and including a hub comprising a securing bolt, said tool including a bracket comprising a generally U-shaped clamp for straddling the axle, means for removably and longitudinally slidably adjustably securing the clamp horizontally on the axle, a hand lever including a forked end portion, means pivotally securing the forked end portion of the lever to the clamp for swinging movement in a vertical plane adjacent one side of the axle, a bar operable in said forked end portion of said lever, an eye on one end of the bar engageable by gravity with the bolt for detachably anchoring said bar to the wheel, and means adjustably and detachably connecting the bar to the lever for actuation in opposite directions thereby for adjusting the wheel longitudinally in either direction on the axle, the first-named means comprising a bolt connecting the free end portions of the clamp legs for drawing said legs toward each other for frictionally gripping the axle therebetween, and aligned setscrews threadedly mounted on the clamp legs and engageable with the axle on diametrically opposite sides thereof for further securing said clamp in adjusted position thereon, the last-named means including a pin on the lever traversing the fork, said bar resting by gravity on said pin and having notches therein selectively receiving said pin, said notches being generally C-shaped for retaining the pin therein upon actuation of the lever in either direction, the second-named means including an upwardly-opening yoke affixed to the bight portion of the clamp and pivotally receiving the lever.

References Cited in the file of this patent

UNITED STATES PATENTS

| | | |
|---|---|---|
| 1,596,464 | Smith | Aug. 17, 1926 |
| 1,975,773 | Davis | Oct. 9, 1934 |
| 2,240,312 | Minturn | Apr. 29, 1941 |
| 2,451,117 | Price | Oct. 17, 1948 |
| 2,763,890 | Cox | Sept. 25, 1956 |
| 2,828,535 | Thompson | Apr. 1, 1958 |
| 2,837,815 | Schumann | June 10, 1958 |
| 2,881,515 | Schoer | Apr. 14, 1959 |
| 2,924,426 | Ellery | Feb. 9, 1960 |

FOREIGN PATENTS

| | | |
|---|---|---|
| 85,676 | Sweden | Feb. 25, 1936 |